United States Patent Office 3,162,661  
Patented Dec. 22, 1964

3,162,661
S-(10-PHENOXARSINYL) ALKANOYL-
AMIDOBENZENE SULFONATES AND
THIOSULFONATES
Joseph E. Dunbar, Midland, Mich., assignor to The Dow
Chemical Company, Midland, Mich., a corporation of
Delaware
No Drawing. Filed Oct. 29, 1962, Ser. No. 233,907
6 Claims. (Cl. 260—440)

The present invention is directed to S-(10-phenoxarsinyl) alkanoylamidobenzene sulfonates and thiosulfonates corresponding to the formula:

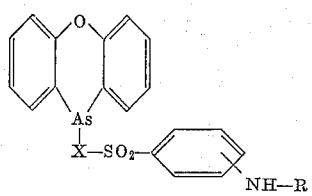

In this and succeeding formulae, R represents lower-alkanoyl and X represents oxygen or sulfur. In the present specification and claims, the expression "lower-alkanoyl" is employed to refer to alkanoyl radicals containing not in excess of 6 carbon atoms. These compounds are crystalline solid materials which are somewhat soluble in many common organic solvents and of low solubility in water. The compounds are useful as parasiticides and herbicides and are adapted to be employed for the control of many plant, mite, insect, bacterial and fungal pests such as worms, mites, roaches, beetles, ascarids, millet, *Bacillus cereus, Alternaria solani*, wild oats and Cabomba. The compounds are adapted to be applied to plants, plant parts and their habitats for the control and inhibition of the growth of fungal, bacterial, aquatic and terrestrial plants.

The novel thiosulfonate compounds of the present invention are prepared by reacting a 10-halophenoxarsine with an alkali metal salt of a thiosulfonic acid corresponding to the formula:

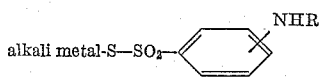

The reaction conveniently is carried out in an organic liquid such as acetone, acetone-water, benzene, toluene and nitromethane. The amounts of the reagents to be employed are not critical, some of the desired products being obtained when employing any proportion of the reagents. In the preferred method of operation, good results are obtained when employing substantially equimolecular proportions of the 10-halophenoxarsine and alkali metal compound. The reaction takes place smoothly at the temperature range of from 0° to 150° C. with the production of the desired product and halide of reaction. The halide appears in the reaction mixture as alkali metal halide. In carrying out the reaction, the reactants are mixed and contacted together in any convenient fashion and the resulting mixture maintained for a period of time in the reaction temperature range to insure completion of the reaction. Following the reaction, the desired product is separated by conventional procedures. In one such procedure, the reaction mixture is filtered and the filter cake washed with water to remove alkali metal halide and obtain the desired product as a residue. The solvent is then removed from the filtrate by evaporation to obtain any additional product. Such products may be combined and further purified by known procedures such as washing with water, solvent extraction and recrystallization.

The novel sulfonate compounds of the present invention are prepared by reacting 10,10′-oxybisphenoxarsine with a sulfonic acid corresponding to the formula:

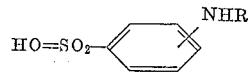

The reaction conveniently is carried out in an organic liquid such as benzene, xylene or toluene as reaction medium. The amount of the reagents to be employed is not critical, some of the desired product being obtained when employing any proportions. In the preferred method of operation, one molecular proportion of the 10,10′-oxybisphenoxarsine is reacted with about two molecular proportions of the sulfonic acid to obtain very desirable results. The reaction takes place smoothly at temperatures of from 0° to 140° C. with the production of the desired product and water of reaction. In carrying out the reaction, the reactants are mixed and contacted together in any conveninet manner and the resulting mixture maintained for a period of time in the reaction temperature range to insure completion of the reaction. In a convenient method of operation, the reaction may be carried out at the boiling temperature of the reaction mixture and under reflux. Upon completion of the reaction, any reaction medium can be removed by evaporation or distillation to obtain the desired product as a solid residue. This product can be further purified by solvent extraction and recrystallization.

The following examples merely illustrate the invention and are not to be construed as limiting.

*Example 1.—S-(10-Phenoxarsinyl) p-Acetoamidobenzenethiosulfonate*

10-chlorophenoxarsine (27.8 grams; 0.1 mole) is dispersed in 85 milliliters of dimethylformamide and the resulting mixture added rapidly to 28.3 grams (0.105 mole) of potassium p-acetoamidobenzenethiosulfonate dispersed in a mixture of 60 milliliters of dimethylformamide. The addition is carried out at room temperature, and the reaction mixture raised to a temperature of from 80° to 100° C. and maintained thereat with stirring for 30 minutes to insure completion of the reaction. The reaction mixture is then cooled and diluted with water. During the dilution, the S-(10-phenoxarsinyl) p-acetoamidobenzenethiosulfonate product precipitates as a crystalline solid. This product is separated by filtration and successively recrystallized from ethanol and nitromethane. The recrystallized product melts at 177.5°–178.5° C. and has carbon and arsenic contents of 50.91 percent and 15.85 percent, respectively, as compared to theoretical contents of 50.74 percent and 15.82 percent.

*Example 2.—10-Phenoxarsinyl o-Hexanoylamidobenzenesulfonate*

10,10′-oxybisphenoxarsine (50.2 grams; 0.1 mole) and 57.8 grams (0.2 mole) of o-hexanoylamidobenzenesulfonic acid are dispersed in 400 milliliters of benzene and the resulting mixture heated for 3 hours with stirring at the boiling temperature and under reflux. During the heating, some of the reaction medium together with the water of reaction is continuously distilled out of the reaction zone, the water separated and the reaction medium returned to the reaction mixture. Following the reaction, the solvent is removed by evaporation, and the residue recrystallized from nitromethane to obtain the 10-phenoxarsinyl o-hexanoylamidobenzenesulfonate as a crystalline solid having a molecular weight of 513 and an arsenic content of 14.6 percent.

In a similar manner, other products of the present invention are prepared as follows:

S-(10-phenoxarsinyl) m-pentanoylamidobenzenethiosulfonate (molecular weight of 515) by reacting together 10-bromophenoxarsine and potassium m-pentanoylamidobenzenethiosulfonate.

S-(10-phenoxarsinyl) o-acetoamidobenzenethiosulfonate (molecular weight of 473) by reacting together 10-chlorophenoxarsine and potassium o-acetoamidobenzenethiosulfonate.

10-phenoxarsinyl p-acetoamidobenzenesulfonate (molecular weight of 457) by reacting together 10,10'-oxybisphenoxarsine and p-acetoamidobenzenesulfonic acid.

10-phenoxarsinyl m-propionylamidobenzenesulfonate (molecular weight of 471) by reacting together 10,10'-oxybisphenoxarsine and m-propionylamidobenzenesulfonic acid.

10-phenoxarsinyl p-butanoylamidobenzenesulfonate (molecular weight of 485) by reacting together 10,10'-oxybisphenoxarsine and p-butanoylamidobenzenesulfonic acid.

S-(10-phenoxarsinyl) o-(formylamido)benzenethiosulfonate (molecular weight of 459) by reacting together 10-chlorophenoxarsine and potassium o-(formylamido) benzenethiosulfonate.

The new compounds of the present invention are useful as herbicides and parasiticides for the control of a number of seed, seedling, established plant and parasite species. For such use, the products are dispersed on a finely divided solid and employed as dusts. Also, such mixtures may be dispersed in water with or without the aid of a surface active dispersing agent and the resulting aqueous suspensions employed as sprays. In other procedures, the products are employed as toxic constituents in solvent solutions, oil-in-water or water-in-oil emulsions or aqueous dispersions. The compounds can also be incorporated in textiles, cutting oils, inks, glues, wood, paints, paper, high energy fuels, latices, plastics, detergents, waters in cooling towers and flood waters in oil wells to inhibit the growth of fungal and bacterial plants or to prevent the degradation of the various products by the plant organisms of rot, mold and decay. In representative operations, aqueous compositions containing 500 parts per million by weight of S-(10-phenoxarsinyl) p-acetoamidobenzenethiosulfonate gives complete kills of Mexican bean beetles, Southern army worms, cockroaches, *Alternaria solani, Bacillus cereus,* coontail and Salvinia.

The thiosulfonates employed as starting materials in accordance with the teachings of the present invention may be prepared in accordance with known methods. In a convenient method, potassium hydrosulfide (KSH) is allowed to react with an alkanoylamidobenzenesulfonyl halide. In a convenient procedure, the reaction is carried out by adding the sulfonyl halide to an aqueous or alcoholic solution of potassium or sodium hydroxide saturated with $H_2S$. Upon completion of the reaction, the desired starting products are separated by conventional procedures. The sulfonyl halides are prepared in known methods and conveniently by the reaction of a suitable alkanoylamidobenzene with chlorosulfonic acid. The sulfonyl halides can be readily hydrolyzed to obtain the corresponding acid compounds.

What is claimed is:

1. The compounds corresponding to the formula:

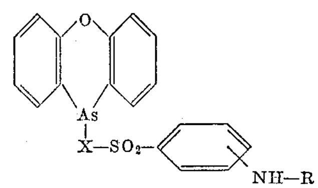

wherein R represents loweralkanoyl and X represents a member of the group consisting of oxygen and sulfur.

2. S-(10-phenoxarsinyl) p-acetoamidobenzenethiosulfonate.

3. 10-phenoxarsinyl o-hexanoylamidobenzenesulfonate.

4. S-(10-phenoxarsinyl) o-acetoamidobenzenethiosulfonate.

5. 10-phenoxarsinyl p-acetoamidobenzenesulfonate.

6. 10-phenoxarsinyl p-butanoylamidobenzenesulfonate.

No references cited.